United States Patent [19]

Allison et al.

[11] Patent Number: 5,542,489

[45] Date of Patent: Aug. 6, 1996

[54] BATTERY THERMAL CHAMBER

[75] Inventors: Johnny H. Allison, Plymouth; Kathleen M. Hammer, W. Bloomfield; David P. Kaminski, Warren, all of Mich.

[73] Assignee: Ford Motor Company, Dearborn, Mich.

[21] Appl. No.: 455,882

[22] Filed: May 31, 1995

[51] Int. Cl.⁶ .................................................... B60R 16/04
[52] U.S. Cl. ............................................ 180/68.5; 219/202
[58] Field of Search .................................. 180/68.2, 68.3, 180/68.4, 68.5; 296/37.1, 76, 198; 105/51; 219/202

[56] References Cited

U.S. PATENT DOCUMENTS

| | | | |
|---|---|---|---|
| 4,252,870 | 2/1981 | Nemeth | 180/68.5 |
| 4,976,327 | 12/1990 | Abujudom, II et al. | 180/68.5 |
| 5,082,075 | 1/1992 | Karolek et al. | 180/68.5 |
| 5,115,116 | 5/1992 | Reed | 219/202 |
| 5,320,190 | 6/1994 | Naumann et al. | 180/68.2 |

FOREIGN PATENT DOCUMENTS

| | | | |
|---|---|---|---|
| 5185885 | 7/1993 | Japan | 180/68.5 |

Primary Examiner—Richard M. Camby
Assistant Examiner—Frank Vanaman
Attorney, Agent, or Firm—Mark L. Mollon; Roger L. May

[57] ABSTRACT

An arrangement for heating and cooling a vehicle battery includes a thermal chamber shaped to hold the vehicle battery. The thermal chamber includes a floor and three walls and is positioned against a fender of the vehicle so that the fender forms a fourth wall of the chamber. The thermal chamber includes an inlet opening for receiving air and an outlet opening for expelling air. The inlet opening receives air from a first inlet duct which transports ambient air from outside of the engine compartment, and from a second inlet duct which transports air from an exhaust manifold of the engine. A temperature controlled damper directs air from either the first inlet duct or the second inlet duct into the inlet opening. An outlet duct transports air expelled through the outlet opening into the engine intake manifold. A filter positioned in the thermal chamber filters the air expelled through the outlet duct. The thermal chamber also includes heating elements which may be energized by household current to heat the thermal chamber.

9 Claims, 2 Drawing Sheets

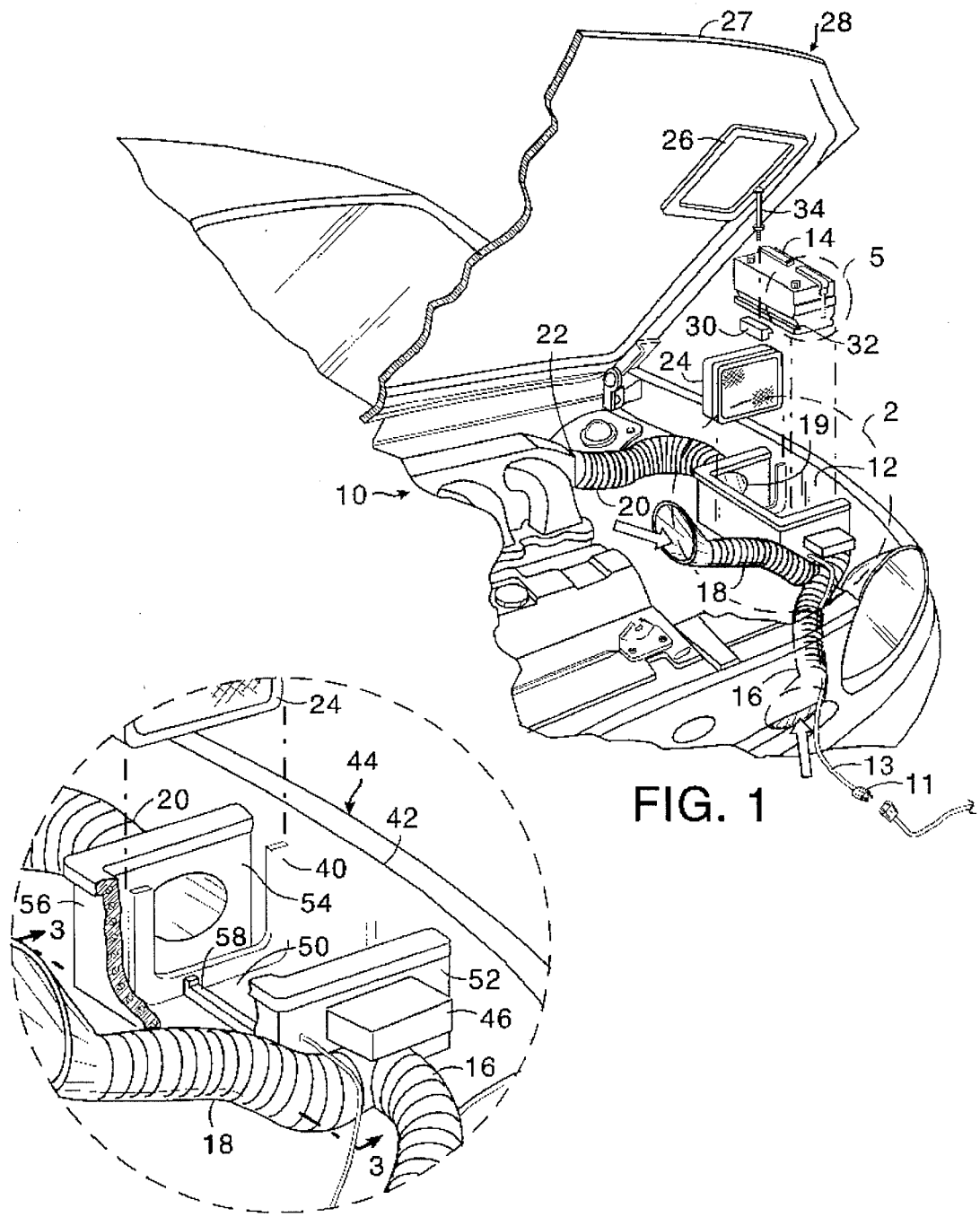
FIG. 1
FIG. 2
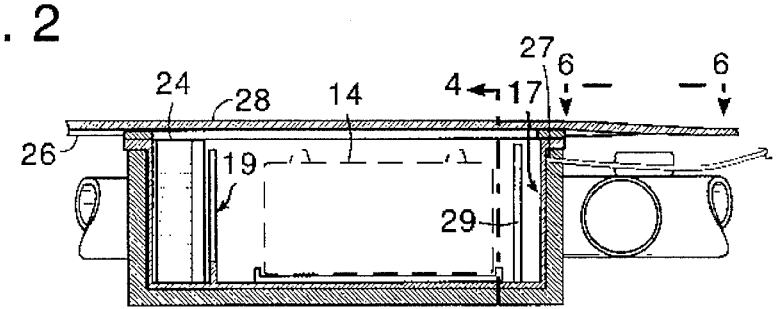
FIG. 3

BATTERY THERMAL CHAMBER

FIELD OF THE INVENTION

This invention relates to the field of thermal management of components in a vehicle and more particularly to management of the temperature of components in a vehicle engine compartment.

BACKGROUND OF THE INVENTION

Battery failure in vehicles occurs for a number of reasons, but the greatest definable contributor to vehicle battery failure is extremely high or low temperatures. In particular, heat is the greatest contributor to battery failure. Typically, the vehicle battery is positioned in the vehicle engine compartment and consequently, is subjected to the significant heat produced by the engine. Consequences of heat on vehicle batteries include increased gassing and corrosion. Extremely low temperatures also contribute to battery failure.

U.S. Pat. No. 5,320,190 entitled *Arrangement for Cooling the Battery of a Motor Vehicle* describes a battery cooling mechanism in which the battery is enclosed in a chamber and air from outside of the engine compartment is drawn through a tube into the chamber and expelled via an outlet tube. Flow of air through the chamber may also be reversed when the vehicle is stationary.

While such a system dissipates heat from the battery, it does not provide for protection from low temperatures. In addition, the chamber for the battery requires additional space in the engine compartment, which is becoming increasingly scarce in modern vehicles.

Accordingly, there is a need for an arrangement which protects a battery from extremes in temperature, while also utilizing a minimum of extra space in the engine compartment.

SUMMARY OF THE INVENTION

It is an object of the present invention to provide a space efficient arrangement for effective thermal management of a vehicle battery.

In a primary aspect of the invention, a thermal chamber is provided to insulate the battery and to promote air flow which cools the battery. The thermal chamber has a first opening through which air travels into the thermal chamber, and a second opening positioned substantially opposite to the first opening, through which air travels out of the thermal chamber. The thermal chamber is mounted to a fender of the vehicle, with the fender forming a wall of the thermal chamber. The thermal chamber further includes a flange around the top perimeter with a flexible material being mounted along the flange. A thermal chamber cover is removably mounted on the top of the thermal chamber for restricting air flow into or out of the thermal chamber when the thermal chamber cover is in a closed position, and for allowing access to the interior of the thermal chamber when the thermal chamber cover is in an open position. The thermal chamber also contains a plurality of elongated ribs mounted on the bottom of the box, and a battery securing means for securing the battery in the thermal chamber.

The arrangement described above provides the advantage of cooling the battery while requiring a minimum of additional space in the vehicle engine compartment. Additional aspects of the invention provide improved thermal management by providing for the heating of the battery during low temperatures and integrating the air flow components of the thermal chamber together with the air flow components of the engine air intake system.

These and other features and advantages of the present invention may be better understood by considering the following detailed description of certain preferred embodiments of the invention. In the course of this description, reference will be made to the attached drawings.

BRIEF DESCRIPTION OF THE DRAWINGS

FIG. 1 is a view of a vehicle engine compartment which contains a preferred arrangement for controlling the temperature of a vehicle battery;

FIG. 2 is an expanded view of the portion of FIG. 1 encircled by dotted line 2;

FIG. 3 is a cross-sectional side view along the dotted line 3—3 in FIG. 2;

DETAILED DESCRIPTION

Figure 6A:
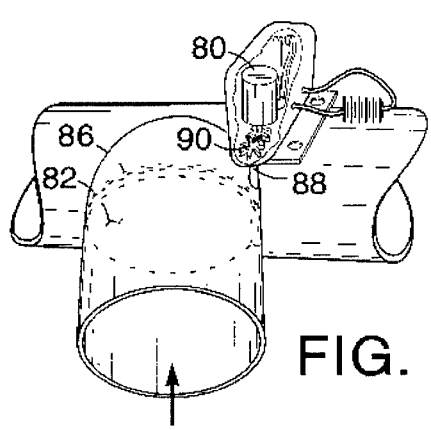
FIG. 6A is a view of FIG. 6 partially rotated about the dotted line 6A, showing a partial cutaway view of element 80.

In FIG. 1 of the drawings, an engine compartment 10 of a vehicle includes a thermal chamber 12 for holding a battery 14. As can be seen, portions of the thermal chamber such as portions 14, 30, 32 and 34 are shown in an exploded view. Thermal chamber 12 receives air via an inlet opening 17 (not shown) through either an ambient air duct 16 or through a hot air duct 18. Air entering thermal chamber 12 exits via an outlet opening 19 through outlet duct 20 which is coupled at a first end to the outlet opening and at a second end to an engine air intake 22. Ambient air duct 16 receives air via convection, from outside of the engine compartment 10 and transports the air, which is at a temperature substantially equal to the outside air temperature, into the thermal chamber 12. Hot air duct 18 is coupled to an exhaust manifold (not shown) of the engine to receive heated exhaust gas produced by the engine. Air traveling through thermal chamber 12 is filtered by air filter 24 before entering outlet duct 20. The filter is of conventional type. The air filtered by filter 24 is sucked into an intake manifold 22 of the vehicle engine. Use of air ducts 16, 18 and 20 for the purposes of the thermal chamber and for transporting air to the intake manifold advantageously reduces components in the engine compartment, thus saving space and reducing cost.

A lid 26 which is mounted on the interior 27 of engine compartment hood 28 functions as a filter cover to seal the thermal chamber from air and dust in the engine compartment when the hood 28 is in a closed position. As seen in FIG. 1, opening of the engine compartment hood advantageously opens the thermal chamber 12, thus providing access to the battery as well as other engine components. Battery 14 is secured inside the thermal chamber 12 by way of a clamp 30 which is shaped to fit into a groove 32 on the battery. The clamp 30 is secured to the thermal chamber 12 by a bolt 34. A similar clamp mounted to the thermal chamber is positioned on the opposite side of the battery and fits into a groove similar to groove 32. The thermal chamber advantageously includes heating elements (shown elsewhere) positioned to heat the walls and floor of the thermal chamber. The heating elements are energized by ordinary household current via an electrical plug 11 and cord 13. A thermostat preferably positioned on top of the duct connected to the inlet opening, of conventional type, controls the amount of heat produced by the heating elements.

FIG. 2 of the drawings shows an expanded view of the portion of FIG. 1 encircled by dotted line 2. As seen in FIG. 2, filter 24 fits into a grooved holder 40. An inside wall 42 of the vehicle fender 44 advantageously forms a wall of the thermal chamber, thus reducing the space in the engine compartment required by the thermal chamber. A thermostat 46 detects the temperature of air in the thermal chamber. A damper (shown in detail in FIG. 6A) positioned at the junction of inlet pipes 16 and 18 operates in response to a temperature signal generated by the thermostat 46 to control the source of air into the thermal chamber. The position of the damper is altered by a motor which is of conventional type and which operates under thermostatic control. When the air temperature in the thermal chamber is equal to or above a predetermined temperature, the damper directs air from inlet tube 16 into the thermal chamber, and when the air temperature in the thermal chamber is below the predetermined temperature, the damper directs air from inlet tube 18 into the thermal chamber.

The thermal chamber is preferably rectangular in shape with the corners of the chamber rounded to minimize potential air flow turbulence. The floor 50, front wall 52, back wall 54 and first side wall 56 are preferably constructed of glass filled polypropylene, which provides a strong and inexpensive enclosure and which meets the necessary thermal and mechanical requirements. Alternative materials which provide the necessary thermal and mechanical requirements will be apparent to those skilled in the art in view of the present disclosure. The inside wall 42 of the fender 44 advantageously forms the second side wall of the chamber. To reduce heat flow between the thermal chamber and the engine compartment the floor 50, front wall 52, back wall 54 and first side wall 56 are each preferably insulated with fiber glass insulation which has an outer shield of aluminum to reject heat and which adheres to the outer surfaces of the thermal chamber by a stick-on adhesive.

Battery 14 is advantageously positioned within the thermal chamber 12 to allow air flow around the top, bottom and both sides of the battery. A pair of ribs 58 (one of which is shown in FIG. 2), are mounted on the floor of the thermal chamber, to elevate the battery to allow air to travel underneath the battery. The ribs are formed to secure the battery in order to prevent end to end motion of the battery. Air flow around the sides of the battery is achieved by securing the battery to the thermal chamber in a position to allow passage of air around each side of the battery.

FIG. 3 shows a cross-sectional view along the dotted line 3—3 of FIG. 2. As seen in FIG. 3, air enters the thermal chamber through inlet opening 17, travels underneath, above, and around the sides of the battery 14, is filtered by filter 24, and exits through outlet opening 19. Ribs 58 secure the battery to prevent end to end motion, and also raise the battery from the floor of the thermal chamber to enable air flow underneath the battery. Heating elements 27 mounted on the walls and floor of the thermal chamber generate heat when energized. The heating elements are conventional and are preferably embedded in an adhesive coated material which adheres to the interior surface of the thermal chamber. An air diverter 29 positioned downstream of the inlet opening and in front of the battery directs air flow around the sides of the battery. Such an arrangement advantageously reduces air turbulence in the thermal chamber and promotes efficient cooling and heating of the battery.

Figure 4:
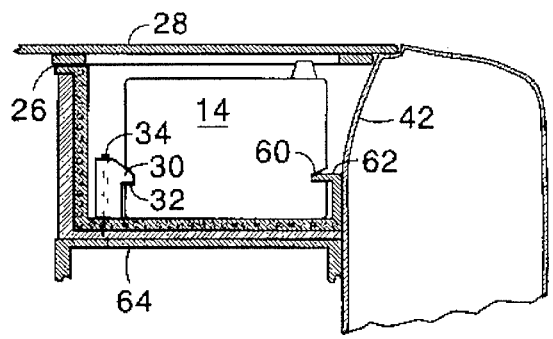
FIG. 4 is a cross-sectional front view along the line 4—4 in FIG. 3.

FIG. 4 shows a cross-sectional view along the dotted line 4—4 of FIG. 3. As seen in FIG. 4, battery 14 is held in position by clamping bar 30 which is shaped to fit into groove 32 in the battery. The clamping bar 30 is held in place by a bolt 34 which is inserted through the clamping bar and which is secured to a nut positioned in a frame 64. The battery, is further held in position by clamp bar 62 positioned to fit into groove 60 of the battery. The hood is shown in a closed position, with lid 26 in combination with hood 28 sealing the top of the thermal chamber.

Figure 5A:
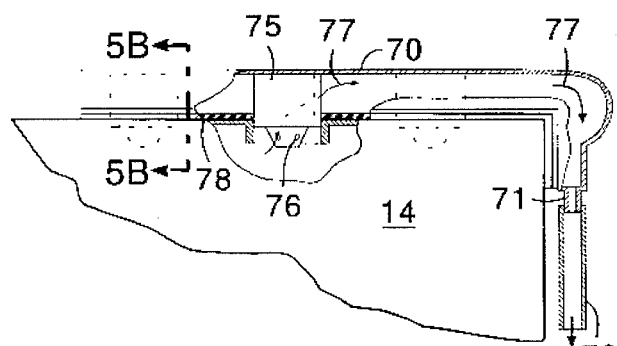
FIG. 5(a) is a cross-sectional view along the dotted line 5A—5A in FIG. 5.
Figure 5:
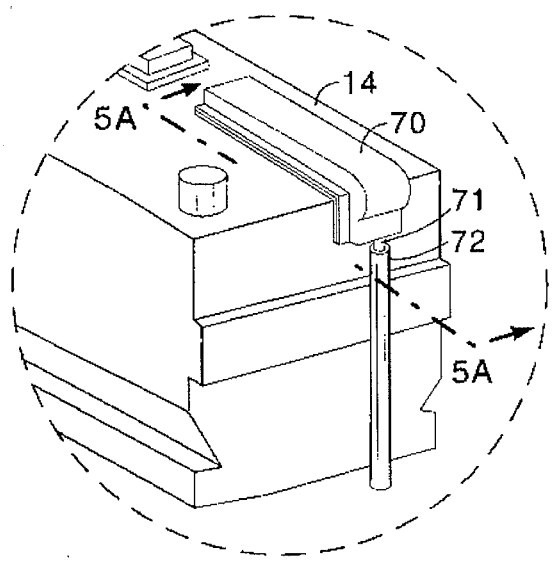
FIG. 5 is an expanded view of the portion of FIG. 1 encircled by dotted line 5.
Figure 5B:
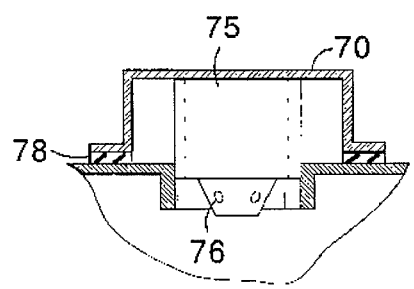
FIG. 5(b) is a cross-sectional front view along the dotted line 5B—5B in FIG. 5A.

FIGS. 5, 5(*a*) and 5(*b*) show various views of a battery gas channel which channels corrosive vapors and liquids escaping the battery out of the thermal chamber. As seen in FIG. 5, the gas channel 70 fits over a battery vent cap (underneath the gas channel) to direct any battery gases or liquids out of the thermal chamber. The gas channel 70 includes a conduit 71 which carries gases and liquids escaping from the battery to a tube 72 which carries the escaping gases and liquids out of the thermal chamber. The conduit 71 and the tube 72 preferably point downward to facilitate the flow of liquid out of the thermal chamber. The gas channel 70, conduit 71 and tube 72 are preferably formed of polypropylene or plastic.

FIG. 5(*a*) shows a cross-sectional view of gas channel 70 along the dotted line 5A—5A of FIG. 5. Gas and liquid inside the battery escape through escape holes 76 in battery vent cap 75 and travel along a path designated generally at 77. The gas channel includes a flexible gasket 78 which forms a seal between the gas channel and the surface of the battery. FIG. 5(*b*) shows, for ease of understanding, a cross-sectional view of the gas channel 70 along the dotted line 5B—5B of FIG. 5A.

Figure 6:
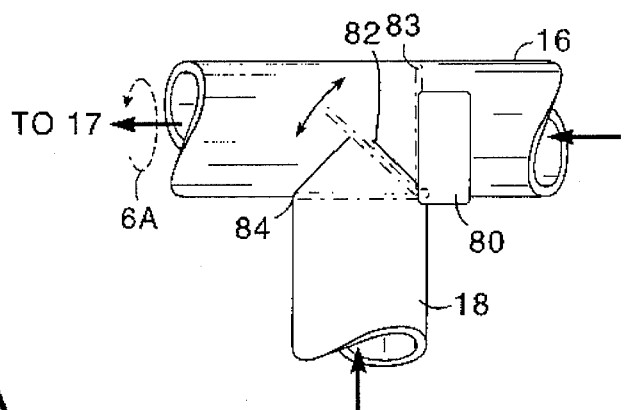
FIG. 6 is an expanded view of a portion of FIG. 3.

FIG. 6 of the drawings shows an expanded view of the joint between intake pipe 16 and intake pipe 18. The source of air to inlet 17 is controlled by damper 82 which swivels, under control of a motor 80, between a first position 83 in which air from intake pipe 18 enters inlet 17, and a second position in which air from intake pipe 16 enters inlet 17. FIG. 6A shows a view of FIG. 6, partially rotated about dotted line 6A, with a partial cutaway view of motor 80. As seen in FIG. 6A, the damper 82 includes a rubber seal 86 around the perimeter of the damper to reduce air flow around the edges of the damper. The damper is attached to a pivot pin 88 which has a gear 90 mounted thereon. The gear 90 is rotated by motor 80 to rotate the damper 82 from the first position 83 to the second position 84. The motor is conventional and operates under control of a signal from thermostat 46 which determines the position of the damper.

As can be seen from the foregoing description, the preferred arrangement offers a number of advantages. When the vehicle is moving, ambient air enters the thermal chamber through duct 16 and cools the battery. In cold temperatures, heated air enters the thermal chamber through duct 18. Also, in cold temperatures when the vehicle is not being used, the battery may be maintained within a predetermined temperature range by inserting electrical plug 11 into a household electrical outlet to energize the heating elements in the thermal chamber.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. In combination, a thermal chamber positioned in an engine compartment of a vehicle comprising, a floor and three walls and being mounted to a fender of said vehicle whereby said fender forms a fourth wall of said thermal chamber, said walls being combined to form an enclosure for holding a vehicle battery, said thermal chamber having a first opening through which air travels into said thermal chamber, and a second opening positioned substantially opposite to said first opening, through which air travels out of said thermal chamber, the thermal chamber further including a flange at a top end of said walls;

a gasket shaped substantially similar to said flange and mounted on a vehicle hood in a position to fit onto said flange when said hood is closed;

a first inlet duct having first end which receives ambient air and a second end;

a second inlet duct having a first end which receives exhaust gas produced by an engine, and a second end;

a third inlet duct having a first end connected to said second end of said first inlet duct and said second end of said second inlet duct, and a second end connected to said inlet opening;

a damper which is positioned within said third inlet duct and which has a first position to allow air from said first inlet duct to enter said third inlet duct and a second position to allow air from said second inlet duct to enter said third inlet duct;

an outlet duct having a first end connected to said outlet opening and a second end connected to an engine intake manifold; and a filter positioned within said thermal chamber for filtering air entering said outlet duct.

2. The invention as set forth in claim 1 further comprising a plurality of heating elements which are positioned on the interior surface of said thermal chamber and which are responsive to electrical energy for heating said thermal chamber.

3. The invention as set forth in claim 1 further comprising a gas channel positioned on a vent cap of said battery;

a gasket positioned between said gas channel and the surface of said battery to form a seal between said gas channel and said battery;

a conduit within said gas channel for transporting gas and liquid escaping from said battery; and an escape pipe having a first end connected to said conduit to receive gas and liquid from said conduit and a second end positioned outside of said thermal chamber.

4. The invention as set forth in claim 1 wherein the walls and floor of said thermal chamber are insulated.

5. Apparatus for managing the temperature of a vehicle battery which is positioned in an engine compartment of a vehicle comprising:

a thermal chamber comprising, a floor and three walls and being mounted to a fender of said vehicle whereby said fender forms a fourth wall of said thermal chamber, said walls being combined to form an enclosure for holding said vehicle battery, said thermal chamber having a first opening through which air travels into said thermal chamber, and a second opening positioned substantially opposite to said first opening, through which air travels out of said thermal chamber, the thermal chamber further including a flange at a top end of said walls;

a gasket shaped substantially similar to said flange and mounted on a vehicle hood in a position to fit onto said flange when said hood is in a closed position;

a first transport mechanism having a first end which receives ambient air and a second end;

a second transport mechanism having a first end which receives exhaust gas produced by an engine, and a second end;

a third transport mechanism having a first end connected to said second end of said first transport mechanism and said second end of said second transport mechanism, and a second end connected to said inlet opening;

a damper which is positioned within said third transport mechanism and which has a first position to allow air from said first transport mechanism to enter said third transport mechanism and a second position to allow air from said second transport mechanism to enter said third transport mechanism;

an outlet transport mechanism having a first end connected to said outlet opening and a second end connected to an engine intake manifold; and a filter positioned within said thermal chamber for filtering air entering said outlet transport mechanism.

6. Apparatus as set forth in claim 5 wherein the damper is responsive to air temperature in the thermal chamber.

7. Apparatus as set forth in claim 6 further comprising a plurality of heating elements which are positioned on the interior surface of said thermal chamber and which are responsive to electrical energy for heating said thermal chamber.

8. Apparatus as set forth in claim 7 further comprising a gas channel positioned on a vent cap of said battery;

a gasket positioned between said gas channel and the surface of said battery to form a seal between said gas channel and said battery;

a conduit within said gas channel for transporting gas and liquid escaping from said battery; and an escape pipe having a first end connected to said conduit to receive gas and liquid from said conduit and a second end positioned outside of said thermal chamber.

9. Apparatus as set forth in claim 8 wherein the walls and floor of said thermal chamber are insulated.

* * * * *